Figure 1:
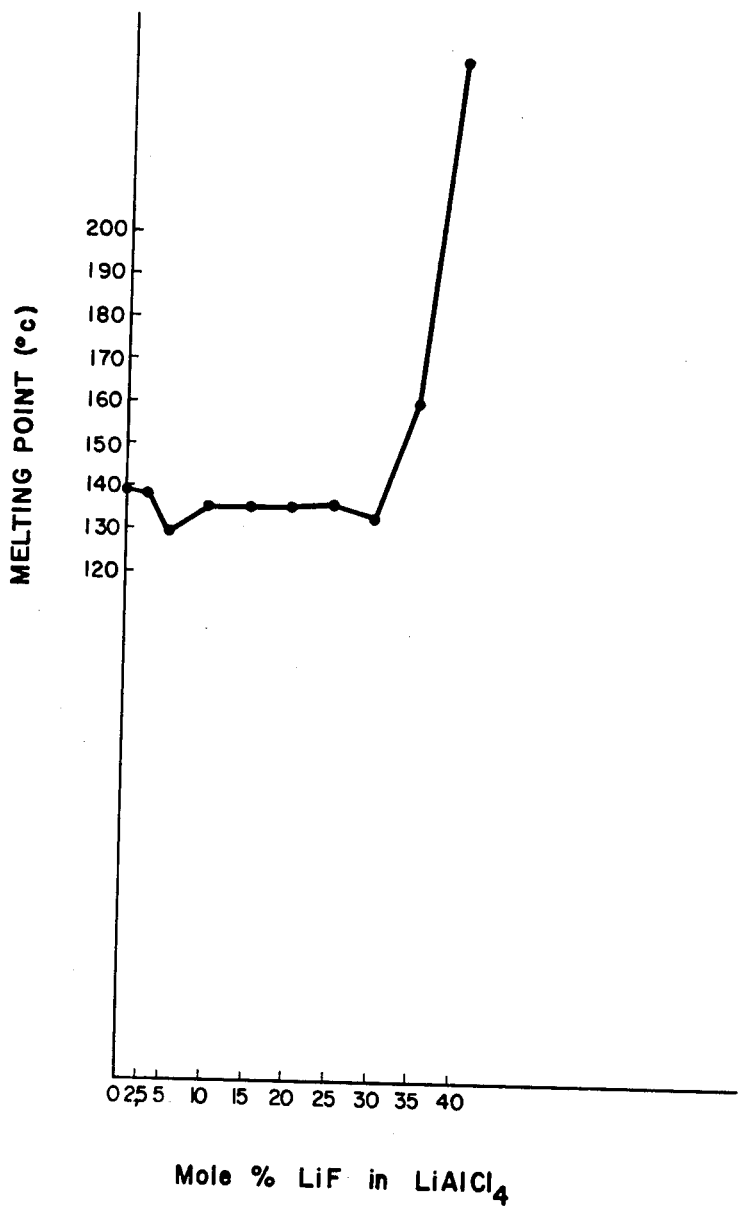

United States Patent [19]

Coetzer et al.

[11] 4,287,271

[45] Sep. 1, 1981

[54] ELECTROLYTE FOR AN ELECTROCHEMICAL CELL, AND AN ELECTROCHEMICAL CELL INCLUDING THE ELECTROLYTE

[75] Inventors: Johan Coetzer; Margaretha J. Nolte; Annemaré de Kock nee Steynberg, all of Pretoria, South Africa

[73] Assignee: The South African Inventions Development Corporation, Pretoria, South Africa

[21] Appl. No.: 179,729

[22] Filed: Aug. 20, 1980

[30] Foreign Application Priority Data

Aug. 22, 1979 [ZA] South Africa ............... 79/4430

[51] Int. Cl.³ .............................................. H01M 4/36
[52] U.S. Cl. .................................. 429/103; 429/112; 429/199
[58] Field of Search ............... 429/112, 103, 191, 199; 423/465, 466, 472, 116

[56] References Cited

U.S. PATENT DOCUMENTS

| | | | |
|---|---|---|---|
| 3,877,984 | 4/1975 | Werth | 429/103 |
| 3,988,163 | 10/1976 | Sklarchuk | 429/103 |
| 4,057,676 | 11/1977 | Rao et al. | 429/199 X |
| 4,063,005 | 12/1977 | Mamantov et al. | 429/103 |
| 4,143,214 | 3/1979 | Chang et al. | 429/112 |

Primary Examiner—Charles F. Lefevour
Attorney, Agent, or Firm—Arnold, White & Durkee

[57] ABSTRACT

An electrolyte for use in an electrochemical cell is disclosed of the alkali metal-aluminium-halide type. The electrolyte has a melting point below 140° C. at atmospheric pressure and conforms with the stoichiometric product $$MAlX_4$$

wherein
M represents lithium cations, a mixture of lithium and potassium cations or a mixture of sodium and potassium cations; and
X represents a mixture of chloride and fluoride anions.

A method of reducing the melting point of a sodium-aluminium-chloride or lithium-aluminium-chloride electrolyte by doping it with a potassium fluoride, sodium fluoride, or lithium fluoride, to obtain said electrolyte with a melting point below 140° C. is disclosed, as are various electrochemical cells employing the product electrolyte.

23 Claims, 3 Drawing Figures

ELECTROLYTE FOR AN ELECTROCHEMICAL CELL, AND AN ELECTROCHEMICAL CELL INCLUDING THE ELECTROLYTE

This invention relates to an electrolyte for an electrochemical cell, and to an electrochemical cell including the electrolyte.

According to the invention an electrolyte for use as a molten salt electrolyte in an electrochemical cell comprises:

aluminium cations;

alkali metal cations selected from the group consisting in lithium cations, a mixture of lithium and potassium cations and a mixture of sodium and potassium cations; and halide anions comprising a mixture of chloride and fluoride anions;

the proportions of the constituents of the electrolyte being selected such that the relative quantities of said aluminium, alkali metal and halide ions conform substantially with the stoichiometric product:

$$MAlX_4$$

wherein:

M represents said alkali metal cations; and

X represents said halide anions;

the proportions of the alkali metal cations and the halide anions making up said stoichiometric product being such that the melting point of the electrolyte at atmospheric pressure is below 140° C.

It will be appreciated that minor quantities of impurities may be tolerated in the electrolyte, i.e. substances which will ionize in the molten electrolyte to provide ions which affect the electrolytic action of the electrolyte, but the quantity of such impurities should be insufficient to alter the essential character of the electrolyte as an $MAlX_4$ system as defined.

The alkali metal cations may comprise a mixture of lithium and potassium cations, the electrolyte being such that it, when expressed as a mixture of aluminium halide, lithium halide and potassium halide, contains not more than 25 mole % potassium halide. The electrolyte may thus have a composition which can be expressed as a mixture of aluminium chloride, lithium chloride and potassium fluoride, containing not more than 25 mole % potassium fluoride, said mole % preferably being between 5 and 20. The lowest melting point is achieved when the electrolyte can be expressed as containing about 15 mole % potassium fluoride, i.e. when the ratio between lithium chloride, potassium fluoride and aluminium chloride can be expressed as 16,5:9,6:73,9 on a mass basis.

The alkali metal cations may comprise a mixture of sodium and potassium cations, the electrolyte being such that it, when expressed as a mixture of aluminium halide, sodium halide and potassium halide, contains between 8 and 30 mole % potassium halide. The electrolyte may thus have a composition which can be expressed as a mixture of aluminium chloride, sodium chloride and potassium fluoride, containing between 8 and 30 mole % potassium fluoride, said mole % preferably being between 10 and 25. The lowest melting point is achieved when the electrolyte can be expressed as containing about 15 to 20 mole % potassium fluoride, i.e. when the ratio between sodium chloride, potassium fluoride and aluminium chloride can be expressed as being between 21,3:9,1:69,6 and 18,3:12,1:69,6.

The electrolyte when expressed as a mixture of aluminium chloride, alkali metal chloride and alkali metal fluoride, may contain between 8 and 25 mole % alkali metal fluoride. The electrolyte may thus have a composition which can be expressed as a mixture of aluminium chloride, lithium chloride and lithium fluoride, containing between 8 and 25 mole % lithium fluoride. The melting point is reduced to an approximately constant value in this region, in which the mole ratio on a mass basis between the lithium chloride, lithium fluoride and aluminium chloride is between 21,9:1,5:76,6 and 10,2:9,4:80,4.

The invention extends to a method of reducing the melting point of an alkali metal aluminium chloride molten salt electrolyte for an electrochemical cell wherein the alkali metal is selected from the group consisting in lithium and sodium, which comprises doping it with an effective amount of at least one alkali metal fluoride selected from the group consisting in lithium fluoride, sodium fluoride and potassium fluoride, together with sufficient aluminium chloride to maintain the stoichiometric product:

$$MAlX_4$$

wherein:

M represents alkali metal cations selected from the group consisting in lithium cations, a mixture of lithium and potassium cations and a mixture of sodium and potassium cations; and X represents a mixture of chloride and fluoride anions, to reduce the melting point of the doped electrolyte to below 140° C. at atmospheric pressure.

When the electrolyte which is doped is either lithium aluminium chloride or sodium aluminium chloride, the dopant may be potassium fluoride, the proportions of potassium fluoride and aluminium chloride added being such that, when expressed as a mixture of aluminium chloride, lithium or sodium chloride and potassium fluoride, the doped electrolyte contains not more than 25 mole % potassium fluoride, said mole % being preferably between 10 and 25.

Instead, when the electrolyte which is doped is lithium aluminium chloride, the dopant may be lithium fluoride, the proportion of lithium fluoride and aluminium chloride added being such that, when expressed as a mixture of aluminium chloride, lithium chloride and lithium fluoride, the doped electrolyte contains between 5 and 30 mole % lithium fluoride.

The invention extends also to a lithium aluminium chloride molten salt electrolyte for an electrochemical cell, which has had its melting point at atmospheric pressure reduced to below 140° C. according to the method as hereinbefore described.

The invention extends further to an electrochemical cell having a molten salt electrolyte as hereinbefore described, coupled together with a compatible anode and a compatible cathode.

The anode may be selected from the group consisting in the alkali metals and the alkaline earth metals and alloys or compositions containing such metals, preferably from the group consisting in lithium, sodium, magnesium and calcium and alloys or compositions containing such metals.

Instead, the cathode may comprise an electronegative substance sorbed into a micromolecular sieve carrier and held captive therein for effective use in the cell, and the micromolecular sieve carrier may be a zeolite.

Without wishing to limit the scope of this application it is noted that "zeolites" are usually identified as members of the class of crystalline or amorphous natural or synthetic materials which contain aluminium and silicon in fairly definite proportions, and their analogues. For a more detailed discussion of zeolite reference can be made to the January 1975 publication of the International Union of Pure and Applied Chemistry entitled: "Chemical Nomenclature, and Formulation of Compositions, of Synthetic and Natural Zeolites".

Specifically, the zeolite material may be a typical synthetic zeolite such as zeolite 3A, zeolite 4A, zeolite 13X or the like. Instead, the zeolite may be in the form of naturally occurring zeolite crystals selected, for example, from the group comprising erionite and faujasite crystals.

Instead, the electronegative substance may be selected from the group consisting in chalcogens and the transition metals.

The cathode may instead comprise or include a carbide or a plurality of carbides of an electronegative substance or of a plurality of electronegative substances which are capable of being halogenated during charging.

Thus the cathode may comprise a substance selected from the group consisting in carbides derived from transition metals or mixtures of transition metals, preferably the group consisting in carbides derived from iron, chromium, ferrochrome and ferromangenese.

Instead, the cathode may comprise an electronegative substance which is held captive for effective operation in the cell by being in the form of an alloy or in the form of a suitable chemical compound or element, or by being held in a micromolecular sieve carrier, and which is capable of being halogenated in the fashion of the sulphur described above.

Suitable cathodes are described, for example, in the applicant's published British Pat. No. 1,555,648 and Patent Application Nos. 2029999, 2030351 and 2032167A.

It will be appreciated during charging of such a cell, the cathode will become halogenated or partially halogenated.

The invention will now be described, with reference to the following illustrative example:

EXAMPLE

Lithium aluminium chloride and sodium aluminium chloride electrolytes were prepared according to the method described by J. R. Morrey, *Inorganic Chemistry*, 2(1963) 163–169.

97% aluminium chloride, obtained from Merck Schuchardt, Hohenbrunn, was sublimed under argon gas at about 190° C. and was then mixed respectively with lithium chloride and sodium chloride (dried under vacuum for about 72 hours at about 450° C.). The mixtures were heated to 210° C. and kept overnight under a flowing stream of argon gas. The temperature was then increased to 500° C. until the melts became transparent and colourless (about 3–6 hours).

Separate samples of lithium fluoride and potassium fluoride were dehydrated under vacuum for 72 hours at 450° C., crushed into a fine powder and respectively mixed with the lithium aluminium chloride and aluminium chloride in different proportions. Similarly, potassium fluoride was mixed with sodium aluminium chloride and aluminium chloride in different proportions. The mixtures were heated in glass tubes under flowing argon gas and the temperatures recorded where melting occurred. Accurate melting points were determined using sealed capillary tubes.

The proportions of the various constituents were varied, but in such a way as to maintain the stoichiometric product $MAlX_4$, where, on the one hand, M is lithium or lithium and potassium and X is chloride and fluoride, or, on the other hand, M is sodium and potassium and X is chloride and fluoride.

The addition of potassium fluoride to lithium aluminium chloride varied from 5 mole % up to 40 mole %. With the proportion of potassium fluoride set at 25 mole % or less, the melting point of the mixture was found to vary between about 106° C. and 125° C., compared with the melting point of lithium aluminium chloride of about 140° C.

The addition of potassium fluoride to sodium aluminium chloride varied from 5 mole % up to 40 mole %. With the proportion of potassium fluoride set at 8 to 30 mole % the melting point of the mixture was found to vary between about 128° C. and 139° C., compared with the melting point of sodium aluminium chloride of about 150° C.

The addition of lithium fluoride varied from 2,5 mole % up to 40 mole %. With the proportion of lithium fluoride set at 30 mole % or less, the melting point of the mixture was found to vary between 129° and 138° C., compared with the melting point of lithium aluminium chloride of about 140° C.

In this regard it should be noted that the references to mole % above, and in the attached drawings, are to mole % in the doped product, and not to starting material, as aluminium chloride is added in each case to maintain said stoichiometric product.

Figure 2:
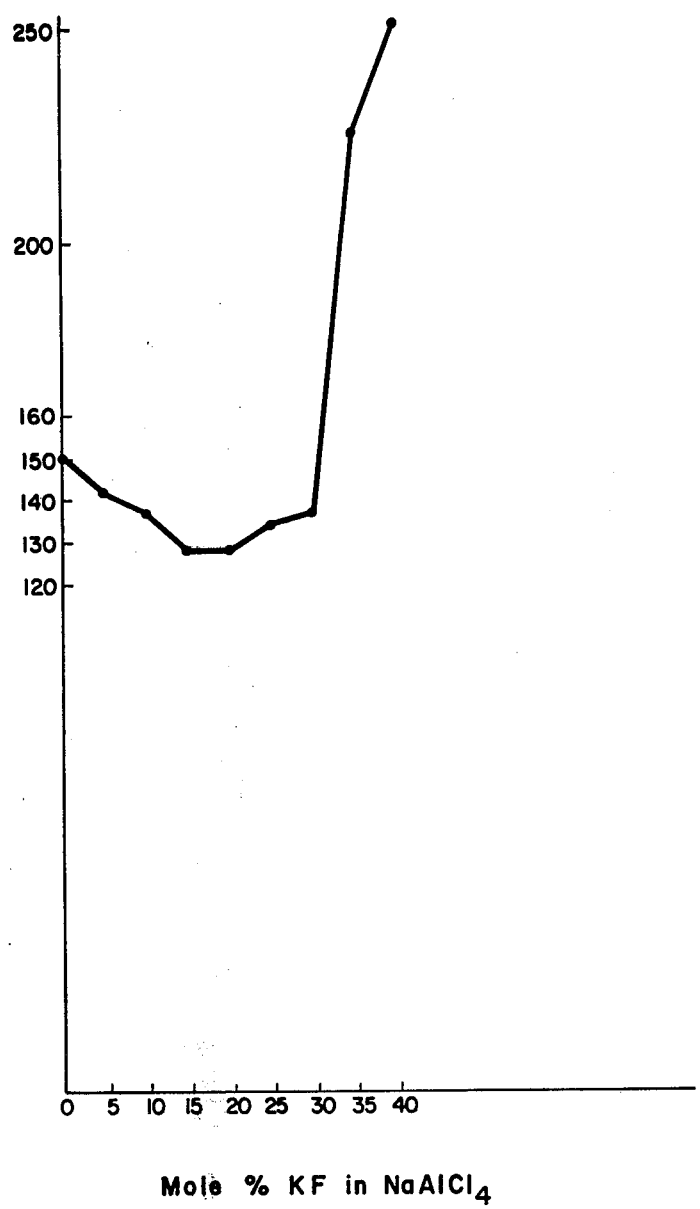
Figure 3:
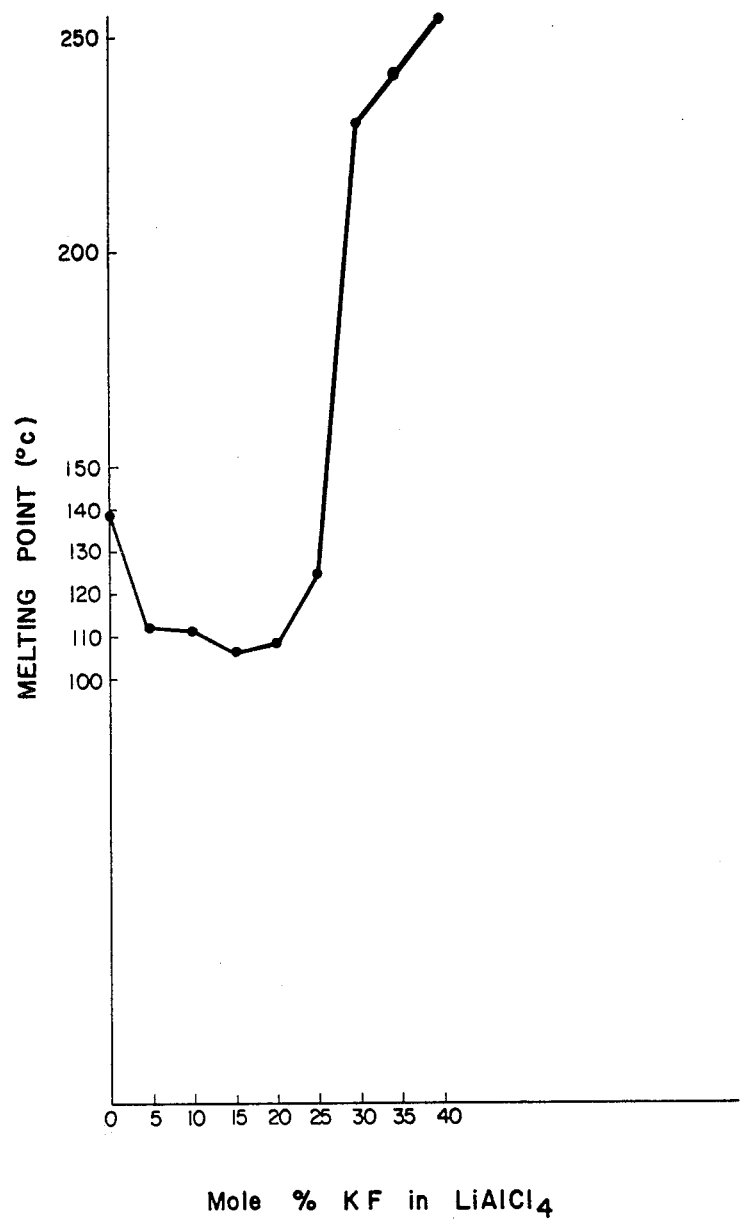

The experimental results achieved are plotted in the accompanying FIGS. 1, 2 and 3, where melting point is plotted respectively against the mole % dopant in the electrolyte mixtures.

The mixtures obtained were tested as the electrolytes in electrochemical cells having lithium/aluminium anodes and cathodes in which elemental sulphur was doped into zeolite. Excellent electrochemical behaviour was observed at operating temperatures in the range 100° C. to 140° C.

The invention has the advantage of providing an electrolyte and an electrochemical cell including it, which have excellent electrochemical behaviour at relatively reduced temperatures, when compared with known lithium aluminium chloride electrolytes.

Furthermore, cells may be made employing an electrolyte according to the invention, according to the following schematic arrangement:

| Liquid metal anode | Solid Electrolyte | Liquid Electrolyte | Solid cathode |
| --- | --- | --- | --- | where
  the liquid metal anode is a suitable alkali metal such as sodium;
  the solid electrolyte is, for example, beta alumina;
  the liquid electrolyte is $MAlX_4$ as defined above wherein the ratio of $LiCl:KF:AlCl_3$ is 16,5:9,6:73,9 by mass or wherein the ratio of $LiCl:LiF:AlCl_3$ is 21,9:1,5:76,6 by mass or wherein the ratio of $NaCl:KF:AlCl_3$ is 21,3:9,1:69,6; and the solid cathode is, for example, Fe$_3$C or (Ze-S) i.e. a suitable zeolite doped with elemental sulphur.

We claim:

1. An electrolyte for use as a molten salt electrolyte in an electrochemical cell, and which comprises:
   aluminium cations;
   alkali metal cations selected from the group consisting in lithium cations, a mixture of lithium and potassium cations and a mixture of sodium and potassium cations; and
   halide anions comprising a mixture of chloride and fluoride anions;
the proportions of the constituents of the electrolyte being selected such that the relative quantities of said aluminium, alkali metal and halide ions conform substantially with the stoichiometric product:

$$MAlX_4$$

wherein:
   M represents said alkali metal cations; and
   X represents said halide anions,
the proportions of the alkali metal cations and the halide anions making up said stoichiometric product being such that the melting point of the electrolyte at atmospheric pressure is below 140° C.

2. An electrolyte as claimed in claim 1, in which the alkali metal cations comprise a mixture of lithium and potassium cations, and which, when expressed as a mixture of aluminium halide, lithium halide and potassium halide, contains not more than 25 mole % potassium halide.

3. An electrolyte as claimed in claim 2, which has a composition which can be expressed as a mixture of aluminium chloride, lithium chloride and potassium fluoride, containing not more than 25 mole % potassium fluoride.

4. An electrolyte as claimed in claim 3, in which said mole % is between 5 and 20.

5. An electrolyte as claimed in claim 1, in which the alkali metal cations comprise a mixture of sodium and potassium cations, and which, when expressed as a mixture of aluminium halide, sodium halide and potassium halide, contains between 8 and 30 mole % potassium halide.

6. An electrolyte as claimed in claim 5, which has a composition which can be expressed as a mixture of aluminium chloride, sodium chloride and potassium fluoride, containing between 8 and 30 mole % potassium fluoride.

7. An electrolyte as claimed in claim 6, in which said mole % is between 10 and 25.

8. An electrolyte as claimed in claim 1, which when expressed as a mixture of aluminium chloride, alkali metal chloride and alkali metal fluoride, contains between 8 and 25 mole % alkali metal fluoride.

9. An electrolyte as claimed in claim 8, which has a composition which can be expressed as a mixture of aluminium chloride, lithium chloride and lithium fluoride, containing between 8 and 25 mole % lithium fluoride.

10. An electrochemical cell having a molten salt electrolyte as claimed in claim 1, coupled together with a compatible anode and a compatible cathode.

11. A cell as claimed in claim 10, in which the anode is selected from the group consisting in the alkali metals and the alkaline earth metals and alloys or compositions containing such metals.

12. A cell as claimed in claim 11, in which the anode is selected from the group consisting in lithium sodium, magnesium and calcium and alloys or compositions containing such metals.

13. A cell as claimed in claim 12, in which the cathode comprises an electronegative substance sorbed into a micromolecular sieve carrier and held captive therein for effective use in the cell.

14. A cell as claimed in claim 13, in which the micromolecular sieve carrier is a zeolite.

15. A cell as claimed in claim 13, in which the electronegative substance is selected from the group consisting in chalcogens and the transition metals.

16. A cell as claimed in claim 10, in which the cathode comprises a substance selected from the group consisting in carbides derived from transition metals or mixtures of transition metals.

17. A cell as claimed in claim 16, in which the cathode comprises a substance selected from the group consisting in carbides derived from iron, chromium, ferrochrome and ferromanganese.

18. A cell as claimed in claim 10, in which the cathode comprises iron sulphide.

19. A method of reducing the melting point of an alkali metal aluminium chloride molten salt electrolyte for an electrochemical cell wherein the alkali metal is selected from the group consisting in lithium and sodium, which comprises doping it with an effective amount of at least one alkali metal fluoride selected from the group consisting in lithium fluoride, sodium fluoride and potassium fluoride, together with sufficient aluminium chloride to maintain the stoichiometric product:

$$MAlX_4$$

wherein:
   M represents alkali metal cations selected from the group consisting in lithium cations, a mixture of lithium and potassium cations and a mixture of sodium and potassium cations; and
   X represents a mixture of chloride and fluoride anions, to reduce the melting point of the doped electrolyte to below 140° C. at atmospheric pressure.

20. A method as claimed in claim 19, in which the dopant is potassium fluoride, and in which the proportions of potassium fluoride and aluminium chloride added are such that, when expressed as a mixture of aluminium chloride, lithium or sodium chloride and potassium fluoride, the doped electrolyte contains not more than 25 mole % potassium fluoride.

21. A method as claimed in claim 20, in which the proportions of potassium fluoride and aluminium chloride added are such that said mole % is between 10 and 25.

22. A method as claimed in claim 19, in which the electrolyte which is doped is lithium aluminium chloride and the dopant is lithium fluoride, and in which the proportion of lithium fluoride and aluminium chloride added are such that, when expressed as a mixture of aluminium chloride, lithium chloride and lithium fluoride, the doped electrolyte contains between 5 and 30 mole % lithium fluoride.

23. A lithium aluminium chloride molten salt electrolyte for an electrochemical cell, which has had its melting point at atmospheric pressure reduced to below 140° C. according to the method of claim 19.

* * * * *